(12) United States Patent
Neo et al.

(10) Patent No.: US 7,506,424 B2
(45) Date of Patent: Mar. 24, 2009

(54) ROTARY TOOL-EQUIPPED TOOL REST

(75) Inventors: Shinya Neo, Niwa-Gun (JP); Tsutomu Osaki, Niwa-Gun (JP); Takahiko Shozusawa, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 11/867,827

(22) Filed: Oct. 5, 2007

(65) Prior Publication Data

US 2008/0086861 A1    Apr. 17, 2008

(30) Foreign Application Priority Data

Oct. 11, 2006    (JP) .............................. 2006-277957

(51) Int. Cl.
*B23B 29/24*    (2006.01)
(52) U.S. Cl. ............................... 29/40; 29/39; 409/191; 409/201; 82/159; 82/121; 82/129; 74/813 C
(58) Field of Classification Search ..................... 29/40, 29/39, 36, 37 C, 27 R; 409/191, 200, 201, 409/211; 408/35, 150; 82/159, 121, 120, 82/129; 74/813 C, 813 R
See application file for complete search history.

(56) References Cited

U.S. PATENT DOCUMENTS

| 3,725,987 | A | * | 4/1973 | Kurimoto et al. | ............ 29/27 C |
| 4,769,885 | A | * | 9/1988 | Nakano et al. | ................. 29/40 |
| 5,161,290 | A | * | 11/1992 | Hashimoto et al. | ............. 29/40 |
| 5,305,509 | A | * | 4/1994 | Yuhara et al. | .................. 29/39 |
| 5,343,604 | A | * | 9/1994 | Takagi | ......................... 29/27 C |
| 6,128,812 | A | * | 10/2000 | Link et al. | ..................... 29/40 |
| 6,257,111 | B1 | * | 7/2001 | Shinohara et al. | ............. 82/120 |
| 6,609,441 | B1 | * | 8/2003 | Sugimoto et al. | ......... 74/813 R |
| 6,704,983 | B2 | * | 3/2004 | Matsumoto | .................... 29/40 |
| 6,865,789 | B2 | * | 3/2005 | Katoh et al. | ................... 29/40 |
| 7,305,745 | B2 | * | 12/2007 | Shibui | ........................... 29/40 |

FOREIGN PATENT DOCUMENTS

JP    05-285709 A1    11/1993

* cited by examiner

*Primary Examiner*—Dana Ross
(74) *Attorney, Agent, or Firm*—Burr & Brown

(57) ABSTRACT

A rotary tool-equipped tool rest is provided, including a movable member made to move frontwardly when a turret is clamped with respect to a non-swiveling housing after swiveling and indexing. Then, a phase determining pin provided in the turret is made to project and engage with the non-swiveling housing. Further, a coupling mechanism to clamp the turret with respect to the non-swiveling housing has three coupling members.

2 Claims, 2 Drawing Sheets

ROTARY TOOL-EQUIPPED TOOL REST

BACKGROUND OF THE INVENTION

1. Field of the Invention

The present invention relates to a rotary tool-equipped tool rest including a swiveling mechanism for swiveling a turret, and a tool rotating mechanism for rotating and driving a plurality of rotary tools attached to a tool station of the turret.

2. Description of the Background Art

A conventional rotary tool-equipped tool rest includes a non-swiveling housing having a tool coupling spindle to transmit a driving force of a driving spindle, where a rotary tool attached to the turret is coupled with a tool coupling spindle only at the time of indexing a station processed by a turret. In this conventional rotary tool-equipped tool rest, when the turret is swiveled and indexed, a spindle core of a rotary tool and a spindle core of tool coupling spindle are necessarily agreed in all stations. Thus, the swiveling turret and the non-swiveling housing having the tool coupling spindle are necessarily positioned (phase-adjusted) with high accuracy in order to agree the spindle cores. However, since a holding spindle of the non-swiveling housing is locked so as not to rotate by a backward key, the holding spindle is easily distorted even when the spindle has a high torsional rigidity and rigidity to lock rotating, and thus it is hard to position (phase-adjust) the turret and the non-swiveling housing with high accuracy. Therefore, in the conventional rotary tool-equipped tool rest, shifting a core spindle of a rotary tool and a core spindle of a tool coupling spindle is caused, and thus load becomes excessive, an abnormal sound occurs, and high speed transmitting and high torque transmitting become hard. Further, when a distance between a locking part and a non-swiveling housing is longer, the above-described problems become more remarkably.

Accordingly, the patent document 1 proposes a turret tool rest including a phase determining pin projectably/retractably provided in a turret, and a phase difference between a non-swiveling housing and the turret is prevented by engaging the phase determining pin with the non-swiveling housing.

Patent Document 1: Japanese Unexamined Patent Publication No. 1993-285709.

However, as for the turret tool rest in the patent document 1, a clamp mechanism to clamp a turret to a non-swiveling housing is structured by so-called two pieces of coupling, and the turret must move frontwardly/backwardly at the time of clamping and unclamping. Thus, since rigidity in the frontward and backward directions of the turret is low, there is a problem that the tool rest is hardly subjected to high accuracy processing. Further, since a mechanism to engage the phase determining pin in the turret to the non-swiveling housing is complicated, there are problems such as the turret tool rest is easily troubled and hardly maintained.

SUMMARY OF THE INVENTION

The present invention solves the above-described problems, and has the object of providing a rotary tool-equipped tool rest with a low production cost, and the tool rest can prevent a spindle core of a rotary tool from shifting from a spindle core of a tool coupling spindle with high accuracy, has a high rigidity in the frontward and backward directions in a turret, and can be subjected to high accuracy processing. Further, the tool rest has a simple mechanism to engage a phase determining pin in the turret to a non-swiveling housing, is hardly troubled, and is easily maintained.

In the present invention, a turret type rotary tool-equipped tool rest has the following aspect. That is, a turret having a rotary tool is rotatably provided at a tool rest main body, a non-swiveling housing is provided in the turret, and the rotary tool is driven by a tool coupling spindle provided at the non-swiveling housing. The tool rest includes a movable member frontwardly/backwardly sliding in the tool rest main body, a first coupling member fixed at a top end of the movable member, a second coupling member provided at the turret, and a third coupling member provided at the non-swiveling housing. The turret is clamped with respect to the non-swiveling housing by frontwardly sliding the movable member and coupling the first coupling member with the second coupling member and the third coupling member. The turret is unclamped with respect to the non-swiveling housing by backwardly sliding the movable member and releasing the coupling of the first coupling member with the second coupling member and the third coupling member. The turret includes a rod-like phase determining pin projectably/retractably provided inside thereof. When the turret is clamped by an operator with respect to the non-swiveling housing after swiveling and indexing, a spindle core of the rotary tool swiveled and indexed by the turret and a spindle core of the tool coupling spindle are positioned in phase so as not to be shifted by making the phase determining pin to project and engage to the non-swiveling housing.

According to another aspect, in the rotary tool-equipped tool rest according to the first aspect of the present invention, the movable member is frontwardly/backwardly slid by a hydraulic mechanism, and the phase determining pin is directly connected with the top end of the movable member.

In the turret type rotary tool-equipped tool rest according to the first aspect of the present invention, a turret and a non-swiveling housing are directly coupled in a shortest root by the phase determining pin. Thus, shifting of the spindle core of the rotary tool from the spindle core of the tool coupling spindle can be effectively prevented with remarkably high accuracy. In addition, when the present invention is applied to an elongated rotary tool-equipped tool rest in which a holding spindle of the non-swiveling housing is locked so as not to rotate at a position distant from the turret, the tool rest can obtain the same effect without an influence of rigidity or accuracy of the holding spindle of the non-swiveling housing. Further, since a coupling mechanism to clamp the turret with respect to the non-swiveling housing has a three piece coupling, the turret does not necessarily move frontwardly and backwardly at the time of releasing engaging. Thus, since rigidity in the frontward and backward directions of the turret is high, the tool rest can be subjected to high accuracy processing.

In the turret type rotary tool-equipped tool rest according to the second aspect of the present invention, a driving mechanism of the phase determining pin is simple, and a driving force is transmitted from a driving source to the phase determining pin without loss. Thus, a driving response of the phase determining pin is quick. Further, the driving mechanism of the phase determining pin is hardly troubled, and is easily maintained. Furthermore, since there are few parts needed for the driving mechanism of the phase determining pin, the production cost is low.

DETAILED DESCRIPTION OF THE INVENTION

Figure 1:
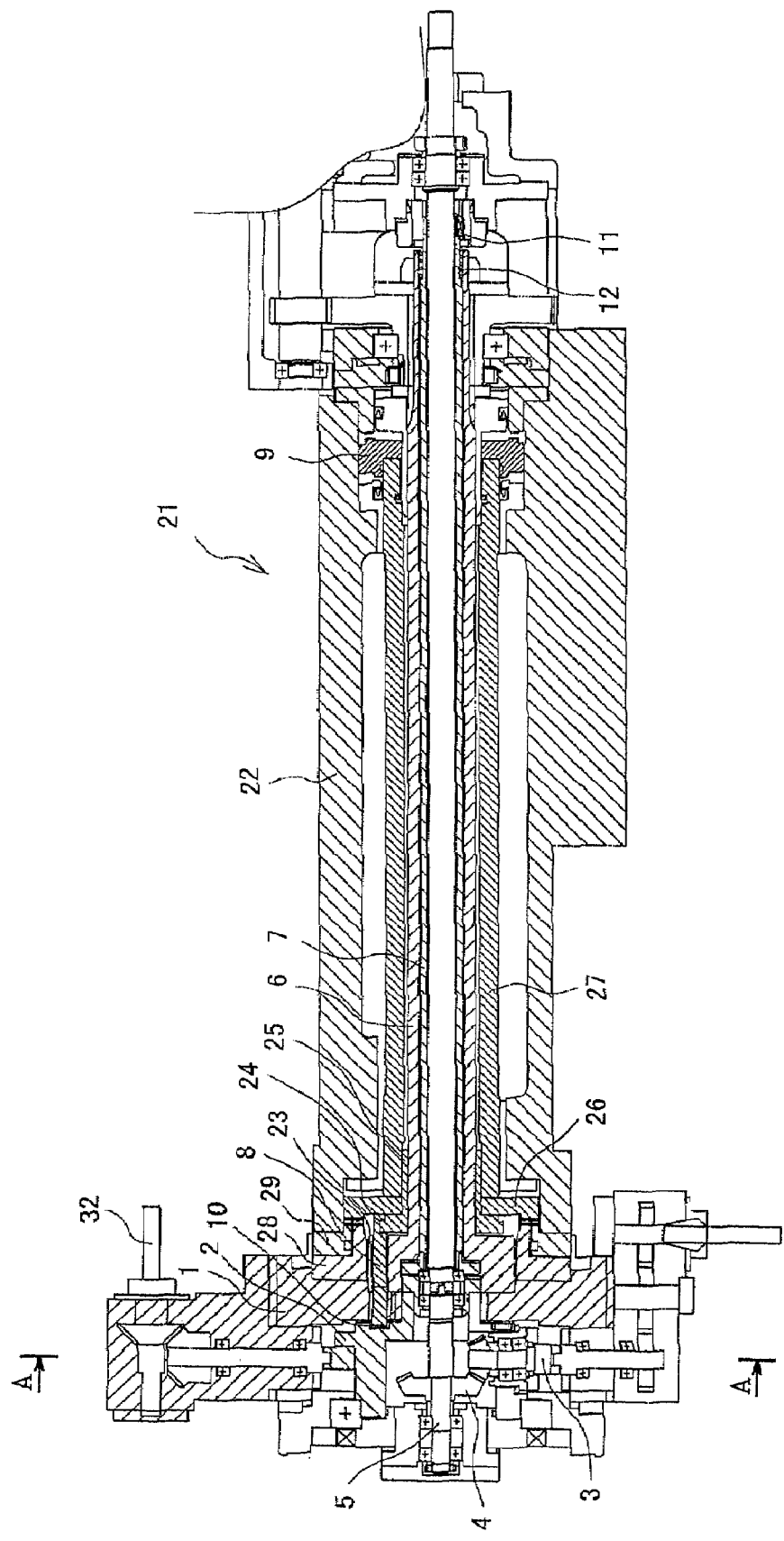
FIG. 1 is an explanation view to illustrate a vertical cross section of a rotary tool-equipped tool rest.
Figure 2:
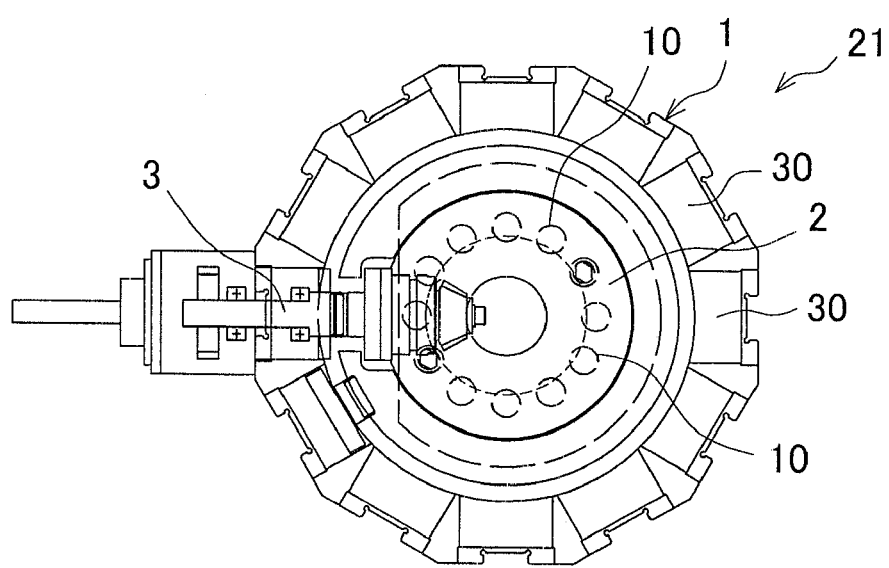
FIG. 2 is an explanation view to illustrate a cross section taken along the A-A line in FIG. 1.

One embodiment of a rotary tool-equipped tool rest of the present invention will be described in detail below referring to the drawings. FIG. 1 illustrates a vertical cross section of a rotary tool-equipped tool rest, and FIG. 2 illustrates a cross section taken along the A-A line in FIG. 1. A rotary tool-equipped tool rest 21 includes a turret 1 rotatably provided at a front end of a tool rest main body 22, in which tools are attached with a turret 1. A long tool driving spindle 5 is rotatably supported by a tool driving motor, which is not illustrated, in the tool rest main body 22. Further, a long cylindrical housing holding spindle 7 is provided at an outer periphery of the tool driving spindle 5, and a base end of the housing holding spindle 7 is strongly fixed at the tool rest main body 22 by a key 11. In addition, the base end of the housing holding spindle 7 includes a spring 12 to frontwardly energize a non-swiveling housing 2 described below.

Further, a long cylindrical turret swiveling spindle 6 is rotatably provided at an outer periphery of the housing holding spindle 7 by a swiveling driving motor which is not illustrated. That is, the inside of the tool rest main body 22 has a three-layers structure in which the tool rotating driving spindle 5 is covered with the turret swiveling spindle 6 and the housing holding spindle 7. Further, a disc like turret 1 is fixed at a top end of the turret swiveling spindle 6.

Twelve tool stations 30, 30, . . . are provided at an outer periphery on the top end side of the turret 1 from a spindle core toward a radial direction at a constant angle, and tool rotating spindles 32 are provided at each tool station 30, 30, . . . . Further, the non-swiveling housing 2 is provided on the top end side of the turret 1, and a top end portion of the tool driving spindle 5 is penetrated into the center of the non-swiveling housing 2. A base end of the non-swiveling housing 2 has a small diameter portion, and the small diameter portion is penetrated into the spindle core portion of the turret 1 and connected (fixed) with the housing holding spindle 7. Further, twelve bushes 10, 10, . . . are bored in a flat columnar shape at an adjacent position to a top end face of the turret 1 in the non-swiveling housing 2. These bushes are in order to fit a top end of the phase determining pin 8 which penetrates the turret 1. Furthermore, the non-swiveling housing 2 includes a tool coupling spindle 3 vertically provided to the tool driving spindle 5, and the rotation direction of the tool driving spindle 5 is changed by 90° by a bevel gear 4 provided at a top end of the tool driving spindle 5.

Further, the turret 1 includes a flat columnar second coupling member 28 fixed at the backward side thereof. The second coupling member 28 has a front side formed in a flange state in which a gear is formed on a base end face of the flange. On the outer side of a small diameter portion of the second coupling member 28, a flat columnar third coupling member 29 is provided and fixed at the tool rest main body 22. The third coupling member 29 has a gear formed on an end face on the base end side which is formed to have a small diameter.

On the other hand, the turret swiveling spindle 6 includes a long columnar movable member 27 provided on an outer periphery thereof. A donut-shaped turret clamp/unclamp piston 9 is fixed at a base end of the movable member 27. The turret clamp/unclamp piston 9 is slid frontwardly and backwardly by supplying pressure oil from an oil inlet for clamp and an oil inlet for unclamp, which are not illustrated. Further, a flat columnar first coupling member 26 having a gear formed along an outer periphery of a top end face thereof is fixed at a top end of the movable member 27. An engaging member 25 having a flange portion is fixed on the spindle core side of the first coupling member 26. In addition, the first coupling member 26, the second coupling member 28 fixed at the turret 1, and the third coupling member 29 fixed at the tool rest main body 22 are to have a three-pieces engaging coupling structure.

Further, a pin inserting hole 23 is bored at the vertical upper position of a rotation spindle core of the turret 1 and in parallel with the rotation spindle of the turret. A phase determining pin 8 is slidably provided inside the pin inserting hole 23. The phase determining pin 8 is formed in columnar state, and includes a cutout part 24 at a base end thereof. The flange portion of the engaging member 25 fixed at the top end of the movable member 27 is engaged with the cutout part 24.

In the rotary tool-equipped tool rest 21 structured as described above, when the turret 1 is unclamped so as to be swiveled and indexed, pressure oil is supplied to an oil inlet for unclamp (not illustrated) so as to backwardly slide the turret clamp/unclamp piston 9. When the movable member 27 is backwardly slid according to the backwardly sliding of the turret clamp/unclamp piston 9, the coupling state of the first coupling member 26, with the second coupling member 28 and the third coupling member 29 is released.

Simultaneously with the releasing of the coupling state of the coupling members, the phase determining pin 8 connected with the turret clamp/unclamp piston 9 through the engaging member 25 is backwardly slid in a pin inserting hole 23 in the turret 1, and released from the bush 10 bored at the non-swiveling housing 12. As a result of this, the turret 1 can be swiveled with respect to the non-swiveling housing 2.

Then, a tool station 30 to be next used is indexed to a predetermined position by operating a swiveling driving motor (not illustrated) connected with the turret swiveling spindle 6 so as to swivel the turret 1. After the tool station 30 is indexed, the turret 1 is stopped, and pressure oil is supplied to an oil inlet for clamp (not illustrated). Then, the turret clamp/unclamp piston 9 is frontwardly slide. When the movable member 27 is frontwardly slide according to the frontwardly sliding of the turret clamp/unclamp piston 9, the first coupling member 26 is engaged with the second coupling member 28 and the third coupling member 29 so as to clamp the turret 1 with respect to the non-swiveling housing 2.

Simultaneously with the engaging of the coupling members, the phase determining pin 8 connected with the turret clamp/unclamp piston 9 frontwardly slides in the pin inserting hole 23 of the turret 1, and a top end of the phase determining pin 8 fits to the bush 10 of the non-swiveling housing 2. Then, a desired tool station 30 is positioned in phase so as to have a correct phase with respect to the rotary tool coupling spindle 3. Further, when a tool driving motor (not illustrated) is operated in this state, the tool driving spindle 5 is rotated, and the rotating force is transmitted to the tool coupling spindle 3 through the bevel gear 4. Then, the rotating force of the tool coupling spindle 3 is transmitted to the tool rotating spindle 32, and thus a rotary tool (a rotary tool for NC turning machine) mounted on the tool station 30 is rotated.

The rotary tool-equipped tool rest 21 is to make the phase determining pin 8 provided in the turret 1 to project and engage with the non-swiveling housing 2 when the turret 1 is clamped with respect to the non-swiveling housing 2 after swiveling and indexing. The turret 1 and the non-swiveling housing 2 are directly connected in the shortest root by the phase determining pin 8. Thus, although the tool rest 21 is an elongated rotary tool-equipped tool rest, it can effectively prevent a spindle core of the rotary tool from shifting from a spindle core of the tool coupling spindle 3 with remarkably high accuracy. Further, since a coupling mechanism to clamp the turret 1 with respect to the non-swiveling housing 2 has a three-pieces coupling including the first coupling member 26, the second coupling member 28, and the third coupling member 29, the turret 1 does not necessarily move frontwardly/backwardly at the time of engaging/releasing the coupling. Thus, since rigidity in the frontward and backward directions of the turret 1 is high, the tool rest can be subjected to high accuracy processing.

As for the rotary tool-equipped tool rest 21, a driving mechanism of the phase determining pin 8 is simple, and a driving force is transmitted from a driving source to the phase determining pin 8 without loss. Thus, a driving response of the phase determining pin 8 is quick. Further, the driving mechanism of the phase determining pin 8 is hardly troubled, and is easily maintained. Furthermore, since there are few parts needed for the driving mechanism of the phase determining pin 8, a production cost is low.

In addition, the structure of a rotary tool-equipped tool rest of the present invention is not especially limited to the above-described embodiment. The constitution of shapes and structures of a tool rest main body, a turret, a non-swiveling housing, a phase determining pin, a turret clamp/unclamp piston and a movable member can be properly changed within the range not to remove from the objective of the present invention.

For example, a turret is not limited to a turret having twelve tool stations, and the number of tool stations provided at the turret can be properly changed according to necessary. Further, a turret clamp/unclamp piston is not limited to a piston operated by an oil pressure, and can be changed to a piston operated by the other driving force such as a motor.

A rotary tool-equipped tool rest of the present invention has excellent effects as described above, and can be widely applied to various kinds of a tool rest in which a turret capable of mounting tools is rotatably supported.

What is claimed is:

1. A turret type tool rest equipped with a rotary tool, the tool rest comprising:
    a tool rest main body;
    a turret having a rotary tool including a spindle core adapted to be swiveled and indexed with the turret, the rotary tool being rotatably provided at the tool rest main body, the turret comprising a rod-like phase determining pin retractable provided therein and adapted to project therefrom;
    a non-swiveling housing provided inside the turret;
    a tool coupling spindle having a spindle core and being provided at the non-swiveling housing for driving the rotary tool;
    a movable member adapted to slide frontwardly and backwardly in the tool rest main body;
    a first coupling member fixed at a top end of the movable member;
    a second coupling member provided at the turret; and
    a third coupling member provided at the non-swiveling housing;
    wherein the turret is adapted to be clamped with respect to the non-swiveling housing by sliding the movable member frontwardly and coupling the first coupling member with the second coupling member and the third coupling member so that the phase determining pin projects and engages the non-swiveling housing and so that the spindle core of the rotary tool and the spindle core of the tool coupling spindle are fixedly positioned in phase; and
    wherein the turret is adapted to be unclamped with respect to the non-swiveling housing by sliding the movable member backwardly and releasing the coupling between the first, second and third coupling members.

2. The tool rest according to claim 1, further comprising a hydraulic mechanism for sliding the movable member forwardly and backwardly, and wherein the phase determining pin is directly connected with a top end of the movable member.

* * * * *